(12) United States Patent
Park et al.

(10) Patent No.: US 8,228,999 B2
(45) Date of Patent: Jul. 24, 2012

(54) METHOD AND APPARATUS FOR REPRODUCTION OF IMAGE FRAME IN IMAGE RECEIVING SYSTEM

(75) Inventors: Young-O Park, Suwon-si (KR); Kwang-Pyo Choi, Anyang-si (KR); Young-Hun Joo, Yongin-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 1595 days.

(21) Appl. No.: 11/652,989

(22) Filed: Jan. 12, 2007

(65) Prior Publication Data

US 2007/0189384 A1 Aug. 16, 2007

(30) Foreign Application Priority Data

Feb. 10, 2006 (KR) ........................ 10-2006-0013288

(51) Int. Cl.
  *H04N 11/02* (2006.01)
  *H04J 3/06* (2006.01)
(52) U.S. Cl. ......... 375/240.25; 375/240.12; 375/240.13; 375/240.14; 375/240.15; 375/240.27; 375/240.28; 380/200; 380/217; 370/519; 370/506; 370/508; 370/516; 370/517; 370/518
(58) Field of Classification Search ............. 375/240.13, 375/240.25; 370/519, 508
See application file for complete search history.

(56) References Cited

U.S. PATENT DOCUMENTS

| | | | | |
|---|---|---|---|---|
| 5,805,762 A | * | 9/1998 | Boyce et al. | 386/314 |
| 6,052,389 A | * | 4/2000 | Kim | 370/516 |
| 6,078,722 A | * | 6/2000 | Kawamura et al. | 386/343 |
| 6,298,055 B1 | * | 10/2001 | Wildfeuer | 370/352 |
| 6,751,400 B1 | * | 6/2004 | Matsumura et al. | 386/346 |
| 7,680,182 B2 | * | 3/2010 | Toma et al. | 375/240.01 |
| 2004/0042505 A1 | * | 3/2004 | Oh | 370/519 |
| 2005/0152457 A1 | * | 7/2005 | Regunathan et al. | 375/240.25 |
| 2005/0232309 A1 | * | 10/2005 | Kavaler | 370/519 |
| 2005/0259694 A1 | * | 11/2005 | Garudadri et al. | 370/503 |
| 2006/0104356 A1 | * | 5/2006 | Crinon | 375/240.12 |

FOREIGN PATENT DOCUMENTS

| | | |
|---|---|---|
| JP | 11-355230 | 12/1999 |
| JP | 2005-101818 | 4/2005 |
| KR | 10-0269548 | 7/2000 |
| KR | 2004-31644 | 4/2004 |

* cited by examiner

*Primary Examiner* — Christian LaForgia
*Assistant Examiner* — Jenise Jackson
(74) *Attorney, Agent, or Firm* — Cha & Reiter, LLC

(57) ABSTRACT

An apparatus for reproduction of an image frame in an image receiving system is disclosed. The apparatus includes a demultiplexer for restoring a received signal to a decodable bitstream and generating start information of each image frame of the bitstream, and an image decoder for decoding the bitstream restored by the demultiplexer, thereby generating a reproducible I frame or P frame, which is an image frame; an image reproduction time uniformity processing module for buffering each image frame output from the image decoder, and then outputting the buffered I frame or P frame while delaying the I frame or P frame based on the start information of each image frame provided by the demultiplexer according to a preset delay time. The present delay time has been preset to be greater than a processing time period required for decoding of an I frame and to be less than a time interval between image frames in the image bitstream. The apparatus may also includes an image output unit for providing an output of the image reproduction time uniformity processing module to an external output unit to display said output.

11 Claims, 4 Drawing Sheets

_US 8,228,999 B2_

METHOD AND APPARATUS FOR REPRODUCTION OF IMAGE FRAME IN IMAGE RECEIVING SYSTEM

CLAIM OF PRIORITY

This application claims the benefit under 35 U.S.C. 119(a) of an application entitled "Method And Apparatus For Reproduction Of Image Frame In Image Receiving System" filed in the Korean Intellectual Property Office on Feb. 10, 2006 and assigned Serial No. 2006-13288, the entire contents of which are incorporated herein by reference.

BACKGROUND OF THE INVENTION

1. Field of the Invention

The present invention relates to a method and an apparatus for image processing, more particularly, to reproducing an image frame in an image receiving system which uses H.223, which is a third generation partnership projection (3GPP) standard for image communication.

2. Description of the Related Art

In general, H.324 recommended by the Telecommunication standardization sector of the International Telecommunication Union (ITU-T) is a standard for efficient multiplexing of video and audio in an error-prone channel, such as a radio channel. H.324 includes rules for H.223 multiplexing, H.223/Annex A multiplexing, H.245 control, H.263 video coder/decoder (CODEC), and G723.1 audio codec. In particular, the H.223 recommendation proposes rules to multiplex/demultiplex images, voice, data, etc. in order to realize an image communication and a video conference in an integrated digital network.

FIG. 1 is a block diagram illustrating conventional image originating/receiving systems connected via a circuit network 140. In an image originating system, an image input unit 110 takes charge of reception of image data. An image encoder 120 compresses the image data in order to efficiently transmit the corresponding image. The image encoder 120 may uses an H.263, MPEG-4, or H.264 encoding scheme. A multiplexer 130 multiplexes the encoded image data into one bitstream in order to transmit the encoded image data through the circuit network 140. The multiplexed bitstream is transmitted to an image receiving system through the circuit network 140.

In the image receiving system, a demultiplexer 150 restores data received through a channel to a decodable bitstream. An image decoder 160 decodes a compressed bitstream to generating a reproducible image. An image output unit 170 displays the image, which has been generated through the image decoding, on an external output device such as an LCD.

FIG. 2 is a view depicting an image frame originating scheme of the conventional image originating system using H.223. After an image frame is encoded by the image encoder 120, the image frame becomes a bitstream of an I frame or P frame. The bitstream is multiplexed together with a control signal and/or an audio signal according to a predetermined image reproduction ratio by the multiplexer 130, and is then transmitted through a channel. In this case, the image originating system generates and transmits an image bitstream at a time interval of 1/fs [sec] through an image encoding process.

FIG. 3 is a view depicting an image reproduction scheme of the conventional image receiving system using H.223. A bitstream transmitted from the image originating system is input to the demultiplexer 150. Since the image has been encoded at the time interval of 1/fs [sec] upon image encoding, the image is desired to be reproduced at the same time interval. However, a real reproduction time of the image is expressed in Equation 1.

$$P_i = T_i + \Delta m_i + \Delta d_i$$

($P_i$:real playout time, $T_i$:absolute playout time, $\Delta m_i$:demux delay, $\Delta d_i$:decoding delay)     (1)

In Equation 1, "$P_i$" represents a real reproduction time of an $i^{th}$ frame. "$T_i$" represents an absolute time for image reproduction, which is scheduled by the image encoder 120. "$\Delta m_i$" represents a delay time required for demultiplexing. "$\Delta d_i$" represents a delay time required for the decoding process of the image decoder 160. A real output time of an image is a time which corresponds to a sum of a time desired to be reproduced by the image encoder 120, a delay time for demultiplexing, and a delay time for decoding process. Generally, since an I frame requires a longer multiplexing time period and a longer image decoding time than a P frame, there is a problem in that the I frame is reproduced later than the P frame, as shown in FIG. 3.

SUMMARY OF THE INVENTION

As described above, since H.223 does not define transmission of information in relation to the image reproduction time, the image receiving system cannot constantly reproduce the image. One aspect of the present invention is to provide a method and an apparatus for reproduction of an image frame that can solve such a problem in image reproduction.

One embodiment of the present invention is directed to an apparatus for reproduction of an image frame in an image receiving system. The apparatus includes a demultiplexer for restoring a received signal to a decodable bitstream and generating start information of each image frame of the bitstream; an image decoder for decoding the bitstream restored by the demultiplexer. This generates a reproducible I frame or P frame, which is an image frame. The apparatus also includes an image reproduction time uniformity processing module for buffering each image frame output from the image decoder, and then outputting the buffered I frame or P frame while delaying the I frame or P frame based on the start information of each image frame provided by the demultiplexer according to a preset delay time, which has been preset to be greater than a processing time period required for decoding of an I frame and to be less than a time interval between image frames in the image bitstream; and an image output unit for providing an output of the image reproduction time uniformity processing module to an external output unit so as to display said output.

In another embodiment, the image reproduction time uniformity processing module includes a time indication generator for generating time indication information corresponding to the start information provided by the demultiplexer, based on the preset delay time; a jitter buffer for buffering each image frame provided by the image decoder; and a reproduction controller for controlling output time of each image frame output from the jitter buffer, based on type information of each image frame provided by the image decoder and image reproduction time indication information provided by the time indication generator.

Yet another embodiment of the present invention is directed to a method for reproduction of an image frame in an image receiving system. The method includes the step of: receiving a bitstream transmitted from an image originating system, and demultiplexing and decoding the image frame;

temporarily buffering the decoded image frame; and outputting an I frame or P frame of each buffered image frame while delaying the I frame or P frame, according to a delay time, which is determined in advance to be greater than a processing time period required for decoding of an I frame and to be less than a time interval between image frames of the image bitstream.

BRIEF DESCRIPTION OF THE DRAWINGS

The above and other aspects, features and embodiments of the present invention will be more apparent from the following detailed description taken in conjunction with the accompanying drawings, in which.

DETAILED DESCRIPTION

Hereinafter, embodiments according to the present invention will be described with reference to the accompanying drawings. In the following description, many particular items such as a detailed component device are shown, but these are given only for providing a better understanding of the present invention. Therefore, it will be understood by those skilled in the art that various changes in form and detail may be made within the scope of the present invention.

Figure 4:
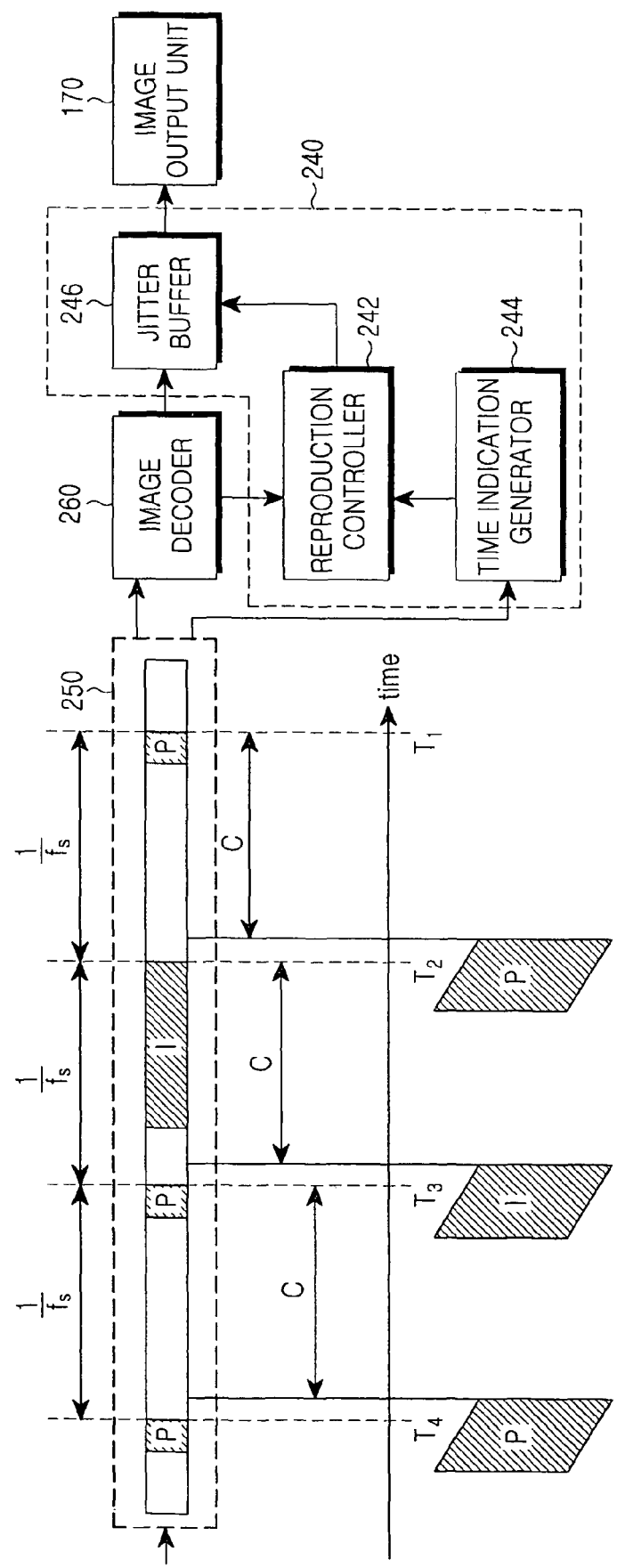
FIG. 4 is a block diagram illustrating the construction of an image receiving system according to an embodiment of the present invention.

FIG. 4 is a block diagram illustrating an image receiving system according to an embodiment of the present invention. In the image receiving system, a demultiplexer 250 restores a signal, which has been received through a channel, to a decodable bitstream. In this case, the demultiplexer 250 provides start information of each image frame to an image reproduction time uniformity processing module 240. Since it is possible to recognize a start time of each image frame by using a packet marker existing in the header of a demultiplexed bitstream, the demultiplexer 250 provides start information of each image frame by checking such a packet marker.

An image decoder 260 decodes a compressed bitstream to generate a reproducible image, i.e., an I frame or P frame. In this case, the image decoder 260 provides type information (i.e., I or P frame) of each image frame to the image reproduction time uniformity processing module 240.

The image reproduction time uniformity processing module 240 buffers each image frame output from the image decoder 260. The image reproduction time uniformity processing module 240 then delays each of the I and P frames, which have been decoded by the decoder 260 and buffered, based on the start information of each corresponding frame provided by the demultiplexer 250, according to a delay time "C" which has been predetermined in advance, and then outputs the I and P frames. In this embodiment, the preset delay time "C" is a constant which has been determined in advance to be greater than a processing time period required for decoding of an I frame and to be less than the time interval between image frames in an image bitstream.

An image output unit 270 displays an image output from the image reproduction time uniformity processing module 240 on an external output device such as an LCD.

The construction of the image reproduction time uniformity processing module 240 will now be described in detail. The image reproduction time uniformity processing module 240 includes a time indication generator 244, a jitter buffer 246, and a reproduction controller 242. The time indication generator 244 generates time indication information for normal reproduction of each frame based on the start information of each corresponding frame, which has been provided by the demultiplexer 250, according to the delay time "C" which has been predetermined in advance. The jitter buffer 246 buffers each image frame provided by the image decoder 260. The reproduction controller 242 can recognize information about each frame and a time at which the frame can be normally reproduced, by using type information of the frame provided by the image decoder 260 and image reproduction time indication information provided by the time indication generator 244, and controls an output time of each frame which is to be output from the jitter buffer 246 according to the recognized information and time.

Figure 1:
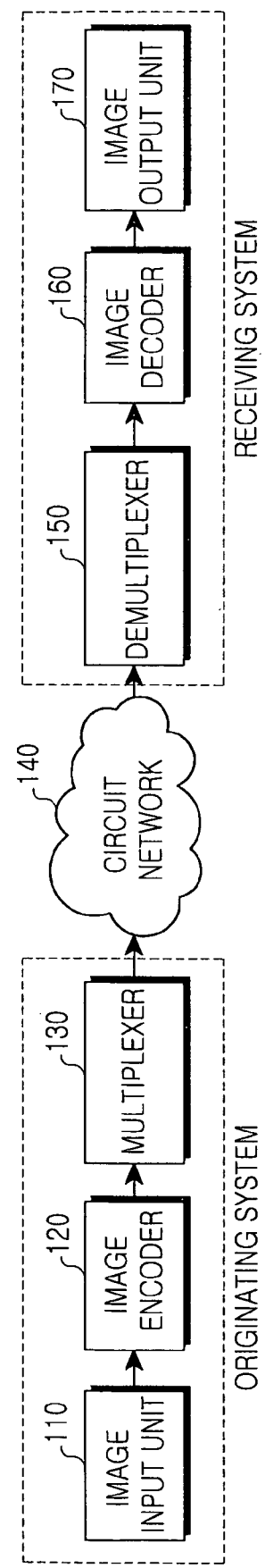
FIG. 1 is a block diagram illustrating conventional image originating/receiving systems connected via a circuit network.
Figure 2:
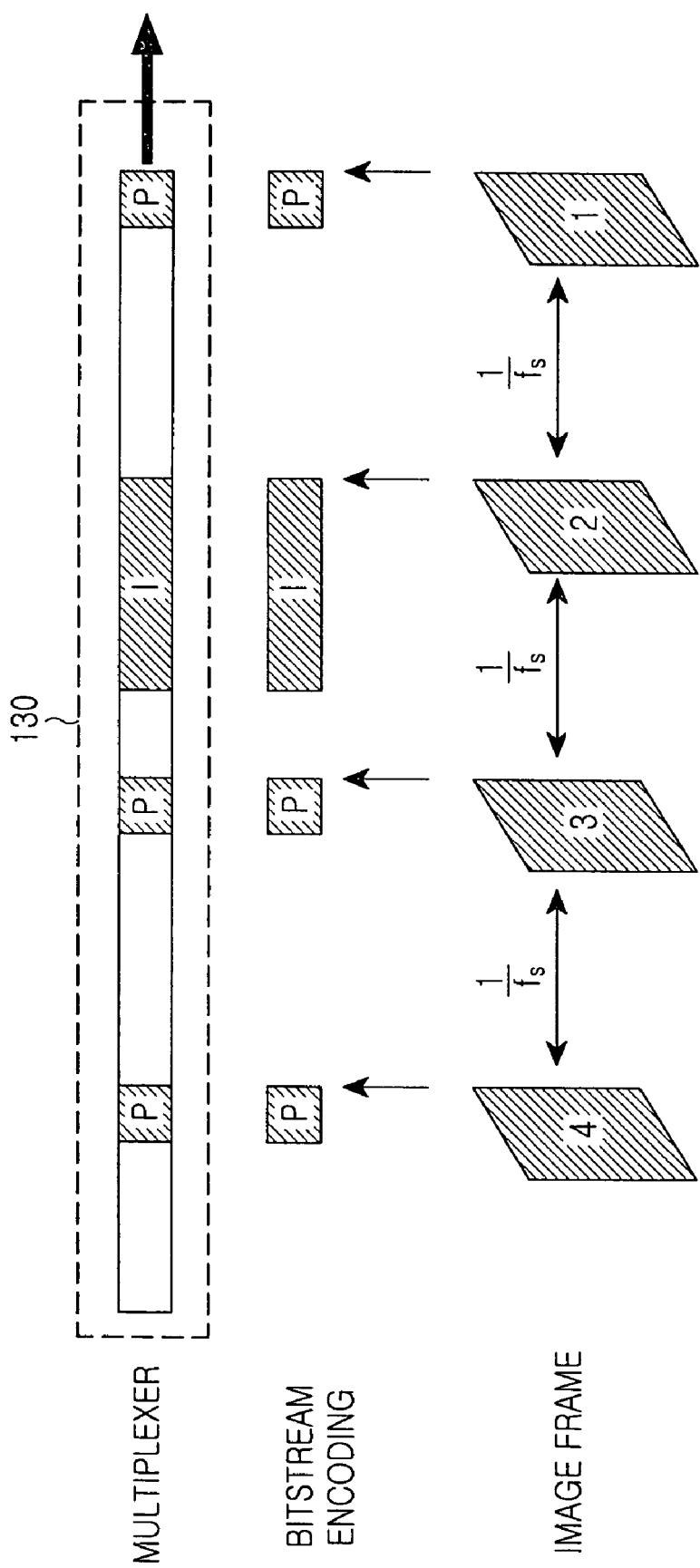
FIG. 2 is a view depicting an image frame originating scheme of the conventional image originating system using H.223.
Figure 3:
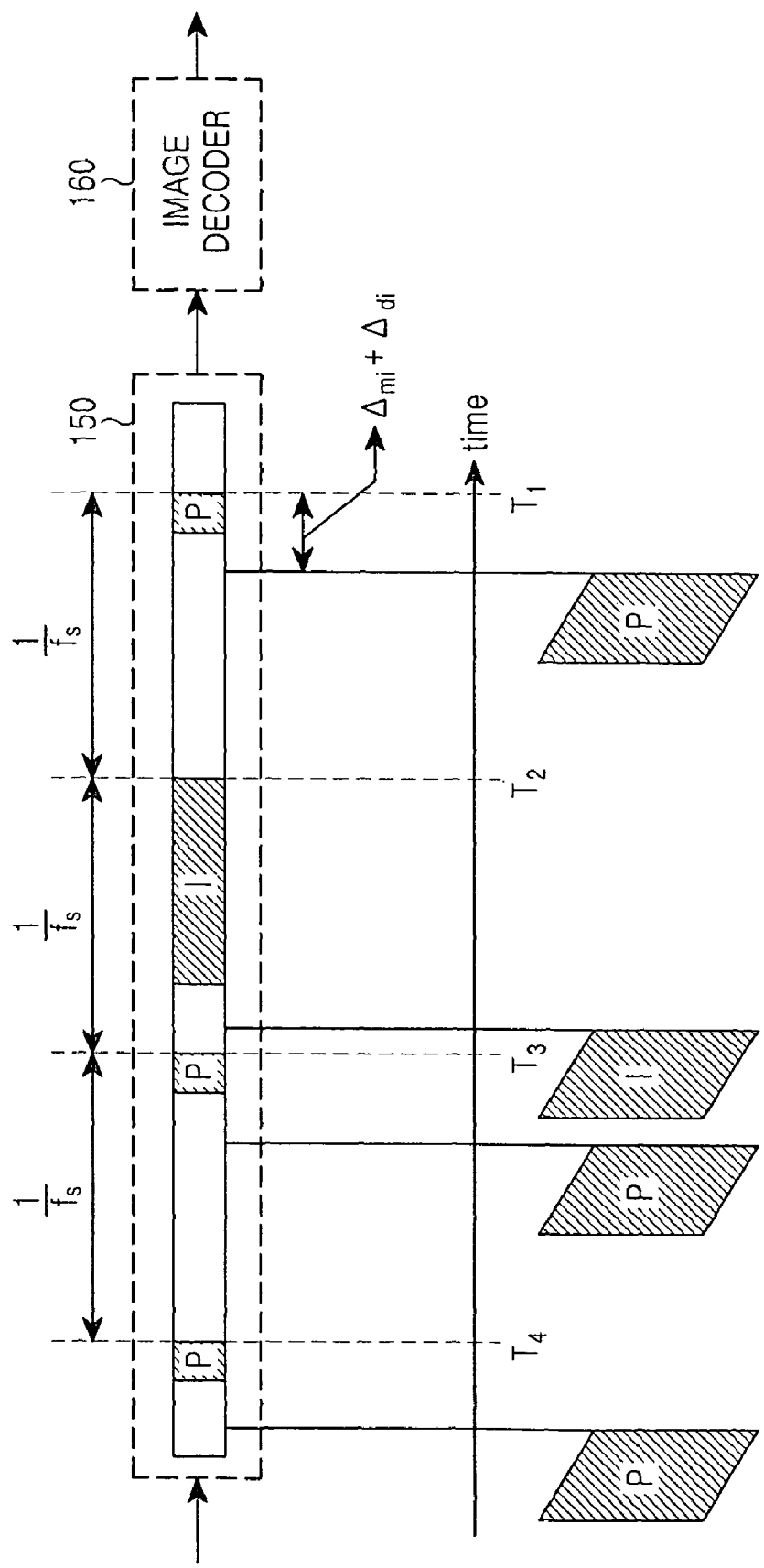
FIG. 3 is a view depicting an image reproduction scheme of the conventional image receiving system using H.223.

The operation of an image receiving system in accordance with an embodiment of the present invention will be described. First, the image receiving system receives a bitstream, which has been transmitted from an image originating system as shown in FIG. 1. Each image frame is demultiplexed and then decoded. In this case, the image receiving system temporarily buffers the I and P frames, and outputs the I and P frames while delaying each of the I and P frames, which have been decoded by the decoder and buffered, according to a delay time "C" which has been determined in advance to be greater than a processing time period required for decoding of an I frame and to be less than the time interval between image frames in an image bitstream. Accordingly, the I frames and P frames are reproduced at an equal time interval.

When the image receiving system reproduces image frames at an equal time interval, as described above, a real reproduction time "p" of each received frame may be expressed as Equation 2.

$$P_i = T_i + C \qquad (2)$$

In Equation 2, "$P_i$" represents a real reproduction time of an $i^{th}$ frame. "$T_i$" represents an absolute time for image reproduction, which is scheduled at the time of image encoding by the image encoder 120 of an image originating system shown in FIG. 1. Also, "C" represents a delay time generated by the time indication generator 244.

A reproduction timing of an image frame will now be described in detail with reference again to FIG. 4.

For example, when a P frame is first input and decoded, the P frame is output under the control of the image reproduction time uniformity processing module 240 after a time period "C" has elapsed from a reception time point of the P frame. Also, when an I frame is secondly input and decoded, the I frame is output after the time period "C" has elapsed from a reception time point of the I frame. Similarly, when another I frame is thirdly input and decoded, the thirdly-input I frame is output after the time period "C" has elapsed from a reception time point of the thirdly-input I frame. It can be understood that all frames, particularly, P and I frames, are reproduced at an equal time interval. This is achieved because the delay time "C" has been properly determined in advance to be greater than a processing time period necessary for decoding of an I frame and to be less than the time interval between image frames in an image bitstream.

As described above, according to the image frame reproduction method of the image receiving system based on embodiments of the present invention, the images of I frames and P frames are output at an equal time interval, so that it is possible to regularly and normally reproduce an image.

While the present invention has been shown and described with reference to certain embodiments of the image receiving system for normal reproduction of image frames, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for reproduction of an image frame in an image receiving system, the method comprising the steps of:
   by image receiving system;
   receiving a bitstream transmitted;
   demultiplexing and decoding the image frame included in the received bitstream;
   temporarily buffering the decoded image frame; and
   outputting an I frame or P frame of each buffered image frame for image reproduction, delayed according to a delay time,
   wherein the delay time is determined in advance to be greater than a processing time period required for decoding of an I frame and to be less than a time interval between image frames of the image bitstream.

2. The method according to claim 1, wherein the demultiplexing and decoding step includes obtaining start information of each image frame of the bitstream from a packet marker the received bitstream.

3. The method according to claim 2, wherein the outputting step includes generating time indication information corresponding to the start information based on the delay time and controlling output time of each I or P frame based on type information of each image frame and time indication information.

4. The method as claimed in claim 1, wherein the image bitstream is transmitted to the image receiving system at a rate of fs frames per second, where fs is also the rate at which image frames of the bitstream are to be reproduced when reproduction begins after the delay.

5. An apparatus comprising:
   a demultiplexer arranged to restore a received signal to a decodable bitstream and to generate start information of each image frame of the bitstream;
   a decoder arranged to decode the bitstream to generate a reproducible I frame or P frame;
   a buffer arranged to buffer each image frame output from the image decoder; and
   an output delay module arranged to output a buffered I frame or P frame, delayed based on start information of each image frame according to a preset delay time;
   wherein the preset delay time has been preset to be greater than a processing time period required for decoding of an I frame and less than a time interval between image frames in the image bitstream.

6. The apparatus as claimed in claim 5, further comprising an image output unit for providing an output of the output delay module to a display device.

7. The apparatus as claimed in claim 5, wherein the output delay module includes:
   a time indication generator arranged to generate time indication information corresponding to the start information provided by the demultiplexer, based on the preset delay time; and
   a reproduction controller for controlling output time of each image frame output from the buffer, based on type information of each image frame provided by the decoder and the time indication information.

8. The apparatus as claimed in claim 5, wherein the received signal comprises an image bitstream received at a rate of fs frames per second, where fs is also the rate at which image frames of the bitstream are to be reproduced when reproduction begins after the delay.

9. An apparatus for reproduction of an image frame in an image receiving system, the apparatus comprising:
   a demultiplexer for restoring a received signal to a decodable bitstream and generating start information of each image frame of the bitstream;
   an image decoder for decoding the bitstream restored by the demultiplexer to generate a reproducible I frame or P frame;
   an image reproduction time uniformity processing module for buffering each image frame output from the image decoder, and then outputting the buffered I frame or P frame, delayed based on the start information of each image frame provided by the demultiplexer according to a preset delay time, wherein the preset delay time has been preset to be greater than a processing time period required for decoding of an I frame and to be less than a time interval between image frames in the image bitstream; and
   an image output unit for providing an output of the image reproduction time uniformity processing module to an external output unit to display said output.

10. The apparatus as claimed in claim 9, wherein the image reproduction time uniformity processing module comprises:
    a time indication generator for generating time indication information corresponding to the start information provided by the demultiplexer, based on the preset delay time;
    a jitter buffer for buffering each image frame provided by the image decoder; and
    a reproduction controller for controlling output time of each image frame output from the jitter buffer, based on type information of each image frame provided by the image decoder and image reproduction time indication information provided by the time indication generator.

11. The apparatus as claimed in claim 9, wherein the image bitstream is transmitted to the image receiving system at a rate of fs frames per second, where fs is also the rate at which image frames of the bitstream are to be reproduced when image reproduction begins after the delay.

* * * * *

UNITED STATES PATENT AND TRADEMARK OFFICE
CERTIFICATE OF CORRECTION

PATENT NO.       : 8,228,999 B2                          Page 1 of 1
APPLICATION NO.  : 11/652989
DATED            : July 24, 2012
INVENTOR(S)      : Young-O Park et al.

It is certified that error appears in the above-identified patent and that said Letters Patent is hereby corrected as shown below:

Column 6, Claim 9, Line 30 should read as follows:
--...based on start information...--

Signed and Sealed this
Twentieth Day of November, 2012

David J. Kappos
*Director of the United States Patent and Trademark Office*